United States Patent [19]

Beeteson et al.

[11] Patent Number: 5,417,791
[45] Date of Patent: May 23, 1995

[54] FACEPLATE BONDING PROCESS FOR A VISUAL DISPLAY UNIT

[75] Inventors: John Beeteson, Skelmorlie; Anthony C. Lowe, Braishfield, both of United Kingdom

[73] Assignee: International Business Machines Corporation, Armonk, N.Y.

[21] Appl. No.: 262,728

[22] Filed: Jun. 20, 1994

[30] Foreign Application Priority Data

Dec. 18, 1993 [GB] United Kingdom ............... 9325932

[51] Int. Cl.⁶ ............................................. B32B 17/06
[52] U.S. Cl. .................... 156/295; 156/107; 156/275.3
[58] Field of Search ............ 156/295, 107, 109, 308.4, 156/275.3

[56] References Cited

U.S. PATENT DOCUMENTS 3,075,870 1/1963 Hedler et al. .................. 156/295
3,305,123 2/1967 Nordby .

FOREIGN PATENT DOCUMENTS 0255958 8/1987 European Pat. Off. .
0434314 12/1990 European Pat. Off. .
 909333 12/1960 United Kingdom .
8504740 4/1985 WIPO .

Primary Examiner—Michael W. Ball
Assistant Examiner—Sam Chuan Yao
Attorney, Agent, or Firm—David Aker

[57] ABSTRACT

A method of bonding faceplates (20) to VDU screens is provided in which an adhesive material is dispensed (80) onto a surface of either the faceplate or the VDU (40), the faceplate and the VDU are brought together (90) to force the adhesive material outwards to fill the gap between the surfaces, and the adhesive material layer (41) which is formed is then cured. In a first curing step (100), curing is carried out around the edges of the faceplate to form a seal around the edges. This first step may be carried out in a dedicated positioning tool. A later curing step (120) ensures that all of the adhesive material layer is eventually cured. Positioning (90) in the dedicated tool may use specific reference points on the faceplate and the VDU rather than relying on physical spacers, and may be carried out under servo control of a system for detecting the onset of undesirable gas entrapment conditions within the adhesive layer. The invention is particularly useful for automated or semi-automated bonding of touch-plates to screens to form touch-input displays, with the avoidance of spacers and with the selective, two-stage curing enabling minimising of time in the positioning tool.

11 Claims, 4 Drawing Sheets

FACEPLATE BONDING PROCESS FOR A VISUAL DISPLAY UNIT

The present invention relates to a process for bonding a faceplate to the display screen of a visual display unit (VDU) or monitor for a computer system, and in particular to a process for adhering together opposed surfaces of a faceplate and a monitor screen using a transparent adhesive material. The process is particularly useful for bonding a faceplate to an integrated tube component (ITC) of a monitor as a step in the manufacture of a monitor having a touch-input enabled display in which the faceplate has associated touch-stimuli sensors.

A monitor having a touch-sensitive display typically includes a cathode ray tube monitor and a transparent, touch-sensitive overlay which is attached to the face of the monitor. Such displays are usually part of a computer system having a small processor. To enable a touch-sensitive display to be used, computer programs are written for execution in the processor. The computer programs define the response of the computer system whenever the screen is touched at particular points. Depending on the particular program, a screen touch may cause video information to be retrieved from an external video source for display on the screen, either alone or in combination with graphics information generated by the processor. A screen touch may also result in the display of processor-generated graphics information only.

Touch-sensitive displays have been implemented using a number of different technologies for detecting touch stimuli. In one such technology, a transparent overlay is placed over a CRT screen. The overlay contains an array of electromechanical pressure sensors which are generally either resistive, conductive or capacitive in form. The sensors are arranged in rows and columns spanning the CRT screen area. Each sensor therefore corresponds to a particular screen location. A signal from one such sensor is thus indicative of a particular screen location. There is a problem with such sensors in that they tend to partially obscure from view whatever image is displayed on the screen. Furthermore, to limit this obscuring effect, the sensors are generally fabricated on a fragile wafer-like substrate which is easily damaged during assembly or use.

Another technology involves the processing of an optical signal scanned across a CRT screen in order to determine a touch location. In general, this technology has problems associated with optical parallax. Furthermore, detection of the optical signal can be prevented by foreign bodies in the vicinity of the CRT screen.

Another technology involves an array of pressure sensitive transducers mounted around the periphery of a CRT screen. Each transducer generates an electrical signal in response to and representative of a touch stimulus applied to the CRT screen. The relative magnitudes of these signals can be processed to determine the location on the CRT screen at which the stimulus was applied. A problem with such an arrangement is that the transducers are sensitive to spurious vibrations of the display. Furthermore, the pressure-sensitive transducers are exposed to any out-of-balance forces which may be produced within the monitor during assembly. Such undesirable effects can be reduced by locating the array of force transducers around the periphery of a transparent push plate which is shaped to match the contours of, but does not make contact with, the CRT screen. A disadvantage with this arrangement resulting from the touch plate being raised above the CRT screen is that a visually objectionable optical parallax effect is produced. Another disadvantage is that internal reflections can occur between the CRT screen and the touch-plate. Furthermore, this arrangement generally requires mountings for the touch-plate which are resilient enough to withstand repeated touch operations as part of a normal product lifetime, yet not so rigid as to limit movement of the touch-plate relative to the CRT screen.

EP-A-0256251 describes a touch-plate arrangement which is similar to that described above. The touch-sensitive screen assembly comprises a frame with openings to align with mounting brackets extending from a display unit such as a CRT screen. The frame supports a rigid transparent touch-plate facing the display. An array of pressure-sensitive transducers is mounted on the touch-plate surface facing the display. The touch-screen assembly is held in position with deformable members positioned at the connection between the openings on the frame and the brackets on the display unit. The deformable members resist shifting of the touch-plate in a direction parallel to the face of the CRT, yet resistance to movement of the plate towards or away from the CRT is minimised. Thus, measurement repeatability during the normal lifetime of the display apparatus is provided. However, the deformable members are large in relation to conventional CRT mounting screws. In addition, this arrangement can also be sensitive to vibrations of the display and therefore complex electronic signal processing is required for conditioning the signals from the transducers.

EP-A-0434314 describes a touch display which is not over-sensitive to vibrational forces, and which prevents optical problems due to parallax or internal reflections from arising. A rigid transparent faceplate with touch sensitive elements thereon is mounted to the display screen using a transparent, elastic, adhesive compound film which has a similar refractive index to that of the display screen. Since the touch-plate is supported by the adhesive compound and not by the display's touch-sensitive transducers, forces generated during assembly of the display unit do not apply undesirable bias to the transducer array.

Known methods for bonding faceplates onto monitors involve positioning spacers at the edges of the ITC screen, or of the faceplate, offering the faceplate up to the ITC screen, and sealing the edge of the faceplate to the ITC to provide a physically contained volume for the adhesive. The seal may have a plurality of pin-holes around its periphery. The face of the ITC is held vertical, oriented so that an opening in the seal is at the top edge. Epoxy resin, which is mixed and outgassed, is then pumped into the opening. The resin is allowed to run out of the pin-holes while the contained volume is being filled, until the operator determines that the space between the ITC and the faceplate is satisfactorily filled. The pin-holes and the filling opening are then covered and the resin is cured. It is generally necessary to trim excess resin from the edges of the assembly after curing. Example methods of the above type are described in relation to the lamination of a transparent safety panel to a CRT screen in U.S. Pat. No. 4,656,522.

SU-A-1446868 describes a method for bonding an anti-glare filter to a CRT in which the filter is positioned horizontally at the bottom of a mould, with transparent spacers set at its corners. Resin is poured over the filter and the CRT is then lowered into the mould to press against the resin. The mould walls provide peripheral containment of the resin.

Required is a more efficient method for bonding faceplates to VDU screens which is in particular suitable for manufacture of touch-sensitive displays having touchplates adhered to a display screen. It is desired to increase the scope for automation over the existing faceplate bonding processes (which are generally reliant on operator judgement as noted above), and generally to increase the speed and reduce the cost of the process.

Accordingly, it is a first aspect of the present invention to provide a method of attaching a transparent faceplate to a screen of a visual display unit (VDU), by adhesion of opposed surfaces thereof, comprising the steps of:

dispensing a volume of a transparent adhesive material onto at least one of said surfaces;

bringing said surfaces together in a controlled manner to cause the adhesive material to spread across said surfaces towards their edges to fill the gap therebetween;

selectively curing the adhesive material at the edges of the opposed surfaces to secure the faceplate to the screen of the VDU; and curing the remaining uncured adhesive material.

The selective curing of adhesive around the edges of the opposed surfaces, without necessarily curing all of the adhesive layer at this stage, represents a great reduction in the time required to fix a faceplate to a VDU screen. Forming a permanent cured adhesive seal, which does not allow leakage of adhesive, enables the visual display unit and attached faceplate to be removed from any support tool that holds them for the bonding operation. This may be after a much shorter time period than is possible with the known processes which require the fixing adhesive to be completely cured in a single operation. The present invention thus enables the production tooling to be used for the attachment process of the next monitor (or batch of monitors) after a reduced time period, reducing the overall production cycle time.

Preferably, the step of selectively curing the adhesive at the edges of the opposed surfaces comprises selectively curing the adhesive material at positions around the edges progressively as the advancing adhesive-to-gas interface reaches the edges at each of these positions. Due to the viscosity and surface tension forces of the adhesive materials which are suitable for this bonding (e.g. acrylic and epoxy resins), the advancing adhesive interface tends to form a bead at the edge of the faceplate. Selective curing is then used to cure this bead as it forms to produce a permanent bond between the opposed surfaces. The endpoint of the adhesive fill of the gap between the opposed surfaces may be automatically determined if the selective curing is automatically actuated when the adhesive reaches the edges.

The progressive selective curing as the adhesive reaches the edge of the faceplate has the effect of preventing mess and wastage of adhesive material that occurs if the adhesive is allowed to overflow from the edges, and reduces the time required for the bonding process. Since the faceplates and CRT screens are substantially rectangular rather than circular, overflow is to be expected to occur from the mid-regions of the edges of the opposed surfaces before the adhesive reaches the corner regions unless there is either selective curing of the adhesive material as described above or physical containment thereof prior to curing, or the viscosity and surface tension properties of the adhesive material are very carefully selected.

It is preferred that the step of selectively curing the adhesive at the edges of the opposed surfaces is carried out in response to a signal from a visual detection means arranged to detect the approach of the adhesive-to-gas interface to the edge of the opposed surfaces. Alternatively or in combination with the use of a visual detection system, the selective curing may involve masking the adhesive layer, other than a portion of the adhesive layer which is in the region of the edges of the opposed surfaces, from curing irradiation. This irradiation may be ultraviolet electromagnetic radiation.

Alternatively, the adhesive material may be cured rapidly as it reaches the edge of the faceplate by laser or other thermal radiation, or by conductive heating—for example, from a hot roller to which the adhesive does not adhere. Another alternative method of rapidly curing the adhesive material at the edges of the faceplate is to pre-coat the edges of the faceplate and the display screen with a chemical curing agent, which causes local rapid curing once the adhesive material comes into contact with it.

An alternative method, which is more applicable to a lower level of automation than is the detection-responsive curing, is to use the known industry techniques of applying a bead of material—e.g. a fast-setting, non-spreading adhesive material such as CIBA Araldite 2010 to provide a physical barrier to the final adhesive material fill. (CIBA and araldite are trade marks of Ciba-Geigy AG). Small exit tubes or holes are made in the bead for the purpose of filling.

It is preferred that the method according to this aspect of the invention includes the step of locating reference points on the faceplate and on the VDU for precise relative positioning of the opposed surfaces. This step is generally intended to comprise either precisely measuring reference points on the VDU and the faceplate or seating the surfaces to be bonded at precise reference points in automatically-positionable support tools. The located reference points enable the final position of the screen relative to the faceplate to be determined without the need for the positioning of physical spacers between the surfaces to be bonded. Alternatively, positioning of the surfaces may involve placing spacers between the surfaces as is known in the art, but the avoidance of the need to position spacers between the surfaces is desirable to simplify the bonding process. More specifically, the use of spacers is undesirable in touch-sensitive displays, since their necessary rigidity constrains the freedom to provide displays in which the faceplate is physically moved relative to the VDU display screen in response to a touch stimulus. Spacers, even if transparent, may also produce undesirable visible effects.

In a second aspect, the present invention provides a method of attaching a transparent faceplate to a screen of a visual display unit (VDU), by adhesion of opposed surfaces thereof, comprising the steps of:

dispensing a volume of a transparent, adhesive material onto at least one of said surfaces;

bringing said surfaces together under the control of signals from a detection system to cause the adhesive material to spread across said surfaces towards their edges to fill the gap therebetween, the detection system being arranged to detect the onset of entrapment of gas behind the advancing adhesiveto-gas interface and to transmit control signals to avoid such entrapment; and curing the adhesive material to secure the faceplate to the screen.

The avoidance of air bubbles in the adhesive layer between the faceplate and the VDU screen is extremely important because of the undesirability of visible air-adhesive interfaces within this layer and of the visual effects which will arise if the layer separating the faceplate and the VDU screen contains patches which have markedly different refractive indexes. The adhesive material should generally be outgassed prior to the step of dispensing adhesive onto a surface to be adhered, assuming the adhesive material is such as to require such a process.

In a third aspect, the present invention provides a method of attaching a transparent faceplate to a screen of a VDU, by adhesion of opposed surfaces thereof, comprising the steps of:

locating reference points on the faceplates and on the VDU for precise relative positioning of said surfaces;

dispensing an adhesive material onto at least one of said surfaces;

bringing said surfaces together in a controlled manner, the final position of the screen relative to the faceplate being determined with reference to said reference points without the need for the positioning of physical spacers between said surfaces; and curing the adhesive material to secure the faceplate to the screen.

The method of positioning the components which are to be secured together according to reference points located thereon avoids the generally accepted prior art requirement for spacers to be positioned between the surfaces, and thereby provides a means to improve manufacturing throughput over these prior art methods. This is especially useful in view of the desirability of increased automation of manufacture.

In a preferred embodiment, the invention provides a method of attaching a transparent plate to a screen of a visual display unit (VDU) for a computer system, by adhesion of opposed surfaces thereof, which plate is to cooperate with touch sensing means for producing a plurality of electrical signals in response to and representative of a touch stimulus applied to the plate by a user, for provision of a touch-sensitive display, comprising the steps of:

locating reference points on the touchplate and on the VDU for precise relative positioning of said surfaces;

dispensing a volume of an outgassed transparent, elastic, adhesive material onto one or both of said surfaces;

bringing said surfaces together in a controlled manner to cause the adhesive material to spread across said surfaces towards their edges to form an adhesive layer which fills the gap therebetween, the final position of the screen relative to the faceplate being determined with reference to said reference points without the need for the positioning of physical spacers between said surfaces;

selectively curing the adhesive at the edges of the opposed surfaces to form a bead of cured resin which secures the touchplate to the screen of the VDU; and curing the remaining uncured adhesive material.

Embodiments of the invention will now be described in more detail, in order that the invention may be more fully understood, with reference to the accompanying drawings in which.

Figure 1:
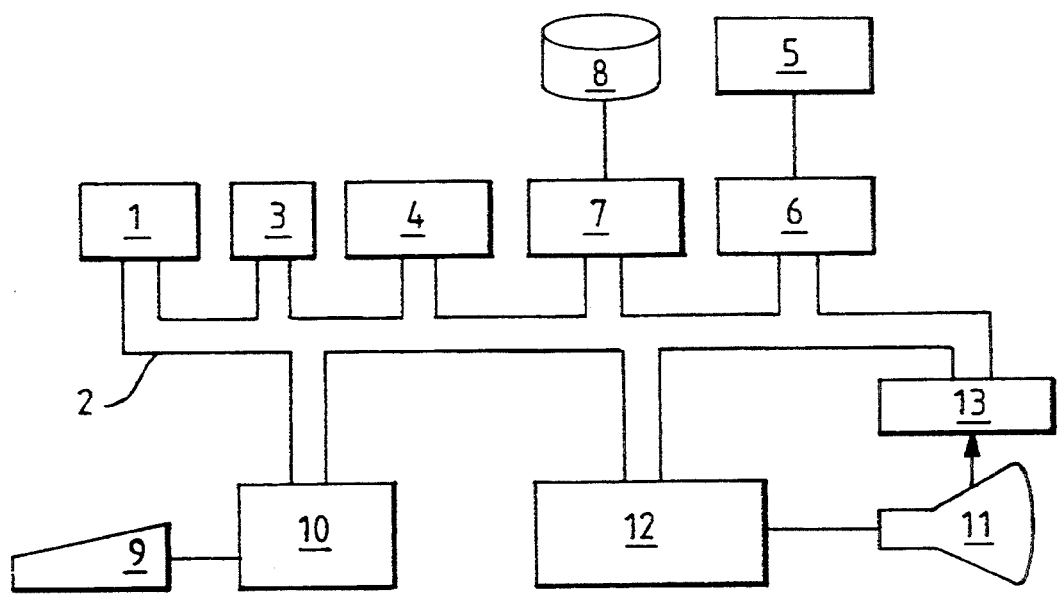
FIG. 1 is a block diagram of an example computer system including a touch-input display such as may be produced according to an embodiment of the present invention.

An example of a computer system including a touch-input display is shown schematically in FIG. 1. The computer system includes a central processing unit (CPU) 1 for executing program instructions. A bus architecture 2 provides a data communication path between the CPU and other components of the computer system. A read only memory 3 provides secure storage of data. A fast random access memory 4 provides temporary storage of data. Data communication with a host computer system 5 is provided by a communication adapter 6. An input/output adapter 7 provides a means for communicating data both to and from a mass storage device 8.

A user operates the computer system using a keyboard 9 which is connected to the bus architecture via a keyboard adapter 10. A touch-input enabled display unit 11 of the present invention provides a visual output from the computer system. The visual output is generated by a display adapter 12. The user can also operate the computer system by applying touch stimulus to a touch-sensitive input screen on the display unit. A touch-input screen adapter 13 connects signals from the touch-input screen to the bus architecture of the computer system.

Figure 2:
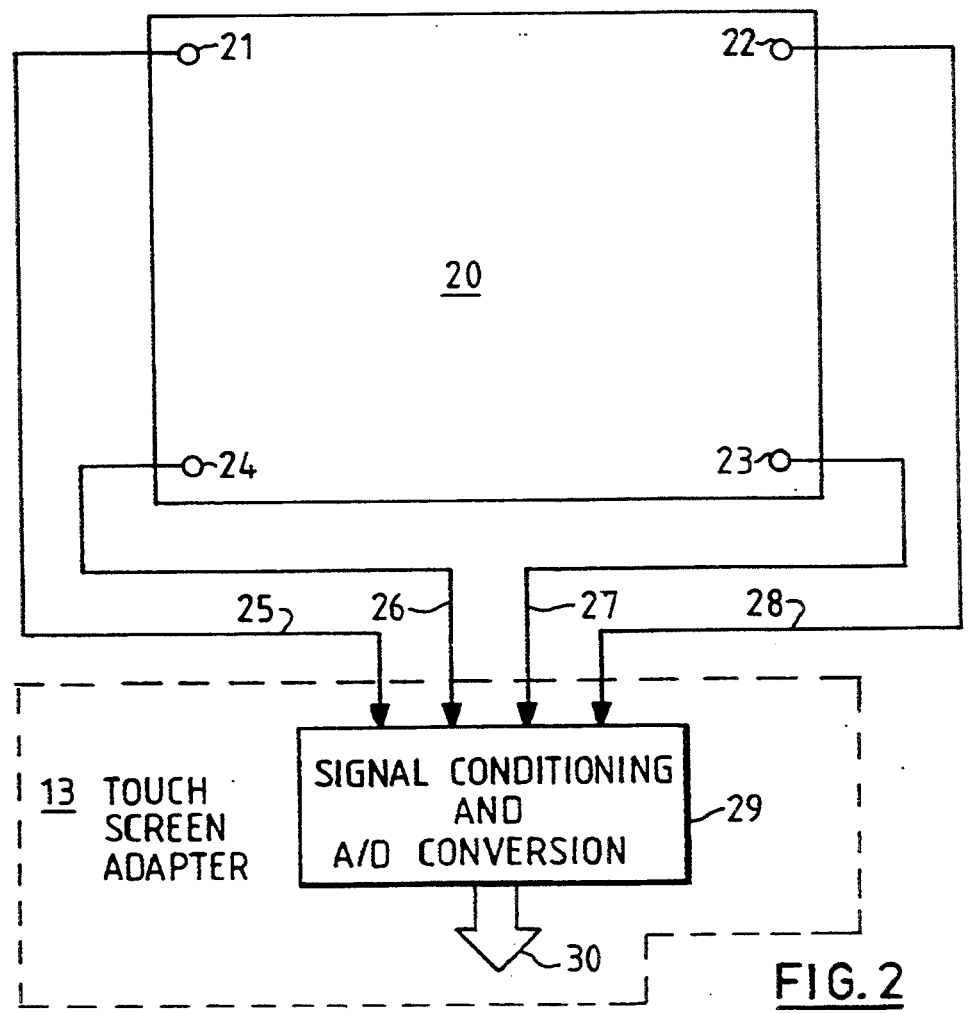
FIG. 2 is a schematic representation of a transducer arrangement which may be used to produce a touch-input display implementing the present invention.

Referring now to FIG. 2, the touch-input screen has four force-sensitive transducers 21,22,23,24 bonded proximate the four corners of a substantially rectangular, transparent touch-plate 20. Four discrete electrical signals 25,26,27,28 are generated by the four transducers, each signal being produced by a separate transducer. The four electrical signals are processed by a signal conditioning and analogue to digital (A to D) converter portion 29 of the touch-input screen adapter 13. The signal conditioning and A to D conversion portion 29 then produces a binary data output 30 indicative of relative forces measured by the four transducers. The binary data output is therefore representative of a location on the display at which a touch stimulus is applied.

Figure 3:
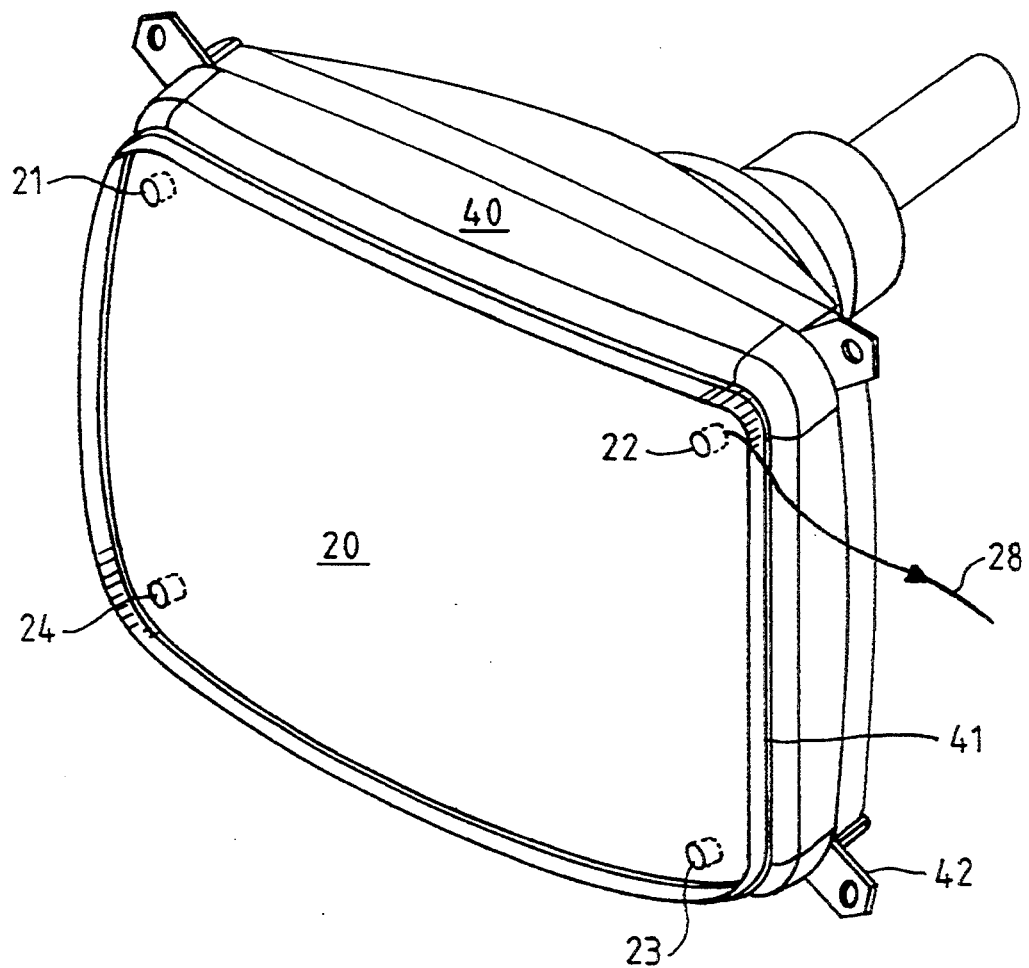
FIG. 3 is a perspective view of a CRT assembly to which a touch-plate has been bonded according to an implementation of the present invention.
Figure 4:
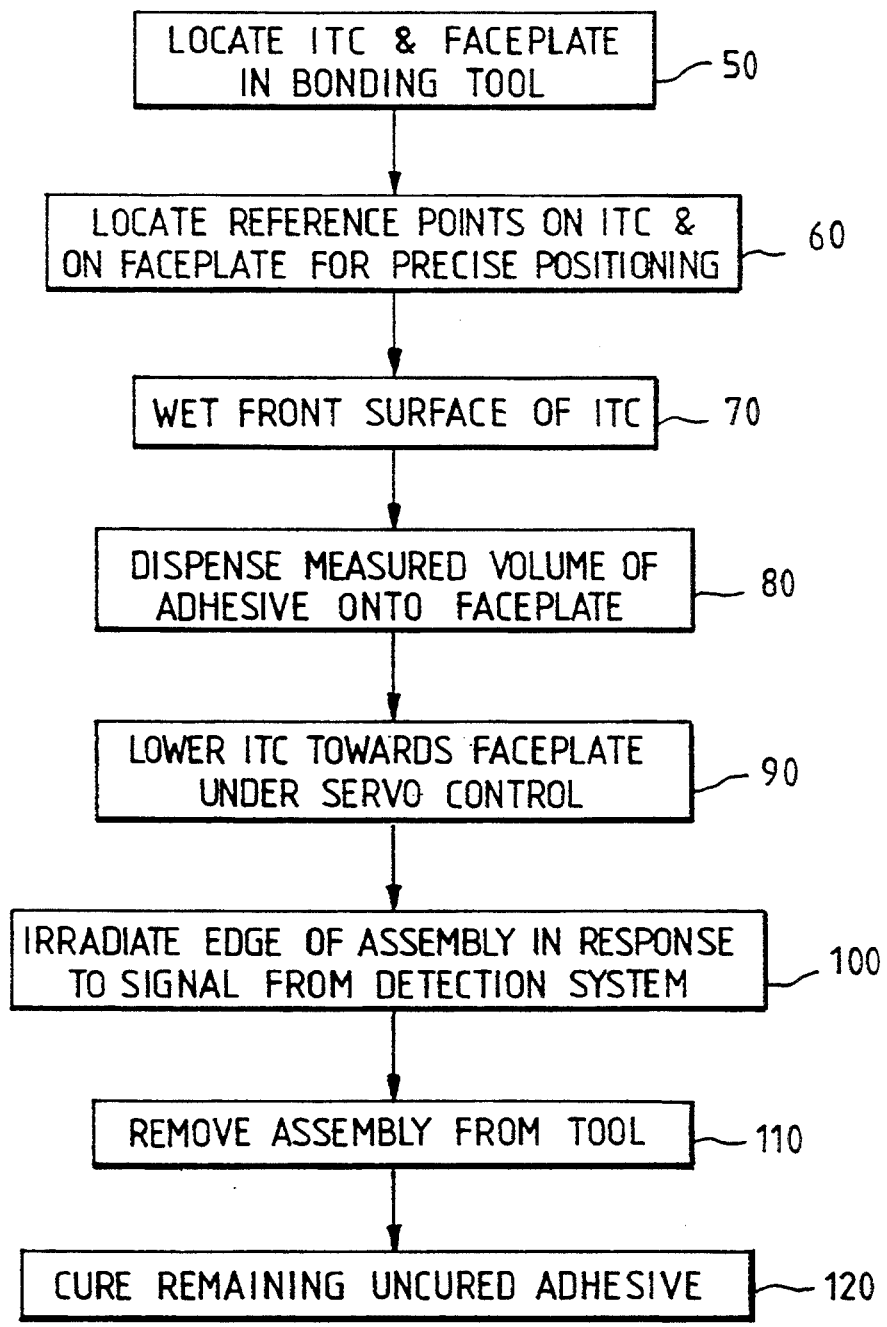
FIG. 4 is a flow diagram of the sequence of steps performed in the attachment of a faceplate to a visual display unit according to a preferred embodiment of the present invention.

Referring now to FIGS. 3 and 4, a touch-input enabled display unit has a touch-plate 20 bonded to the face of a CRT 40 by a uniform layer or film 41 of a transparent, adhesive, elastic compound. A transducer array is mounted on the touch-plate 20, as indicated in FIG. 3 by transducers 21,22,23,24 which produce respective electrical signals 25,28,27,26.

Figure 5:
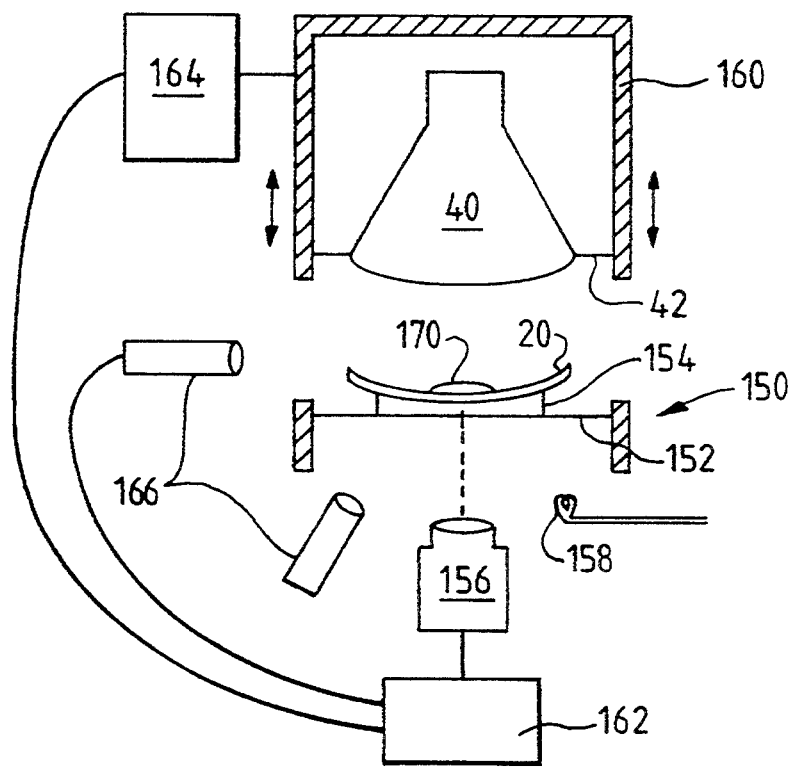
FIG. 5 shows the arrangements of the various components of a bonding apparatus according to an embodiment of the invention.
Figure 6:
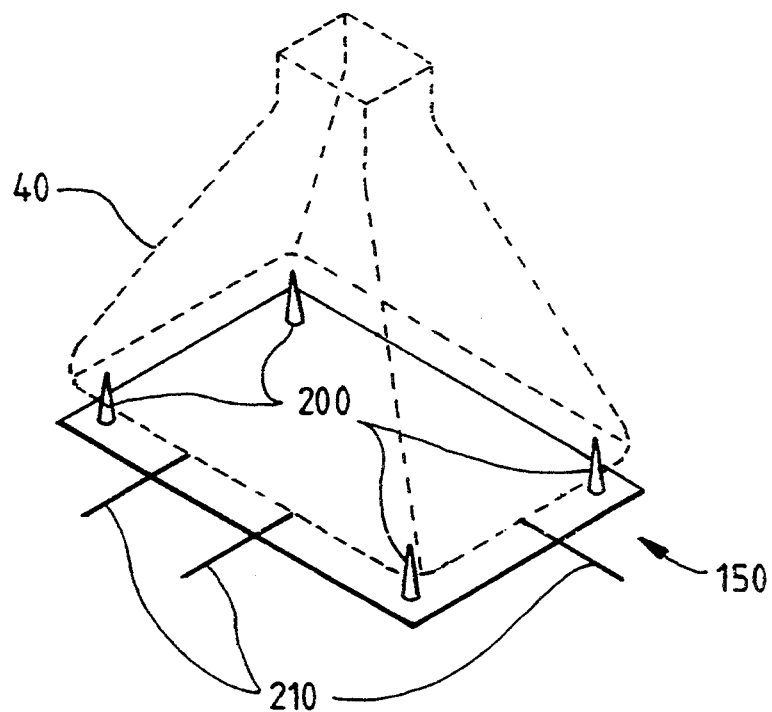
FIG. 6 shows the arrangement of position-measurement devices for a CRT, which form part of the tooling for faceplate bonding according to an embodiment of the invention.

In an automated method of touch-input enabled display manufacture (as represented in FIG. 4 as a sequence of process steps; the apparatus used in the process being shown schematically in FIGS. 5 and 6), a faceplate 20 and an integrated tube component (ITC) 40 are each located 50 in a respective support tool 150,160 for bonding together. The first tool is a location plate 152 for the faceplate, which supports the faceplate in a horizontal position with its concave face upwards, by means of positioning pins 154. The second tool carries the ITC via lugs 42. The lugs are not located in very precise positions (their positions may typically vary by 2 mm in a direction perpendicular to the plane of the display). Specific reference points for automatic positioning are therefore located 60 on each of the faceplate and the ITC surface. Glass surfaces such as CRT screens are conventionally specified by four reference points often referred to as the Z points. They are typically near the screen edge along the diagonals, and locate the surface in space. For one implementation of the reference point location, four location probes 200 for the ITC and four (in the form of the support pins 154) for the faceplate are set at the known Z point positions. The probes 200 for the ITC, which are spring loaded, are brought into contact with the ITC surface to allow the vertical positions of the reference points to be determined, for example by a computer, by connecting the probes for example to a linear potentiometer. Optical sensors could be used as an alternative to the potentiometer connection.

The measurement of the ITC Z point positions uses three horizontally positioned location pins 210 in addition to the aforementioned probes. The edges of the CRT screen are pushed against the pins to determine the location—two pins against one edge and one against a second perpendicular edge. The arrangement of these measurement devices is shown schematically in FIG. 6 (with the position of the CRT during location measurement being shown by broken lines). Location information can again be stored in a computer. The position of the front surface of the ITC is then precisely known, in three dimensions. The initial position of the faceplate in its positioning tool is determined by its support pins 154. The positioning of these pins, which are small enough not to obscure electromagnetic radiation transmitted from beneath the faceplate, is then further controlled (motor driven) to allow alignment with the plane of the CRT screen after its Z point measurement, without the need for physical spacers to be positioned between the surfaces. The faceplate support tool also uses three horizontally positioned location pins to fully determine its position. The distance between the faceplate and the CRT screen is now known.

Whilst the embodiment of the invention described above uses three dimensional positioning measurement for both the faceplate and the CRT, and then adjusts the position of the faceplate to provide correct alignment, alternative embodiments could equally provide for adjustment of the positioning of both components or of the CRT only.

The front surface of the ITC is then wetted 70 with a dilute solution of the adhesive material in a solvent, and the solvent is allowed to evaporate. This guarantees that the surface of the ITC, which will generally be textured so as to reduce reflections therefrom, is completely penetrated by adhesive and no air bubbles are entrapped. If the wetting characteristics and viscosity of the base are optimised, this additional wetting step is not required.

A measured volume of outgassed epoxy or acrylic resin is dispensed 80 onto the centre of the faceplate. A UV-curable adhesive which may be used is CIBA Araldite 4001 or Loctite 350 (Loctite is a trademark of Loctite Corporation). Other adhesive materials could be used as alternatives. The resin compound (or other adhesive material) desirably has a similar refractive index to the two layers which it bonds together, but the refractive index of the textured coating on the ITC front surface is generally different from that of the polished rear surface of the faceplate. Minimising reflections from each of the glass-adhesive interfaces thus requires the adhesive material to have a refractive index which is either a compromise between these two glass surfaces or is not constant. The acrylic or epoxy resin may be selected to chemically soften and swell the silica/polymer textured coating which is known to be provided on a CRT screen to reduce surface reflections. This chemical change has the effect of producing a gradual rather than an abrupt change in refractive index at the interface and thus further minimises reflections.

The ITC is then lowered 90 at a controlled rate towards the faceplate, under the control of servo-control signals from a movement controller 164. As the rate of lowering is increased, so is the tendency to entrap air behind the advancing adhesive-to-air interface. Thus, the rate of lowering is maintained at a rate which will avoid the entrapment. The lowering speed may be automatically controlled in response to signals from a visual detection system, which uses a television system 156,158 (described in more detail below). In an alternative embodiment, the ITC is manually lowered into position. As this lowering operation is continued, the approaching surfaces of the ITC and the faceplate force the resin 170 to spread out laterally from the centre to the edges of the plate, filling the gap between the ITC and the faceplate.

As the resin is forced to spread across the opposed surfaces towards the edge of the faceplate, its position is detected by a visual detection system. The detection system may comprise a television camera 156 which views the faceplate through the support plate 152 of the support tool 150. The underside of the faceplate is illuminated by visible light from a light source 158, and the camera captures images which are then sent to a capture frame store in a computer 162. Signal processing is performed to identify the position and speed of the air-to-resin interface at different times using identification of changes of refractive index. Typically, contrast and edge enhancement techniques common in optical signal processing will be used. One suitable visual detection system is the Synoptics Synapse system with the Semper 6Plus imaging language (Synoptics and SEMPER are trademarks of Synoptics Limited).

As the resin reaches the edge of the faceplate, a signal is transmitted from the detection system to a UV curing apparatus 166. This signal actuates irradiation (100) of the edge of the assembly with ultraviolet electromagnetic radiation, by controlling shutters in front of the UV light sources, to cure the resin at the periphery of the faceplate and thereby to permanently bond the faceplate to the ITC. The faceplate support tool must be optically clear to UV radiation. UV radiation sources are commonly used in industrial processes, and for this application can be selected to optimise wavelength to the particular resin actuator. Such a source of radiation is the Loctite UVAloc 1000. The signal actuating the irradiation apparatus may be generated at the instant that the advancing resin interface reaches the edge of the faceplate at any position (and then progressive selective curing and ITC lowering may be performed simultaneously until the resin has reached all points around the periphery of the faceplate). Alternative methods of curing at the periphery of the faceplate include use of a thermo-setting resin and the application of heat (e.g. by thermal radiation or conductive heating).

The (vertical) gap between the faceplate and the ITC may be predetermined by the known Z point measurement, but preferably the visual detector determines when the resin has reached all points of the periphery of the faceplate and then the lowering is automatically stopped. Thus, the reference points on the faceplate and on the ITC are used to set the horizontal alignment and the visual sensor is used to determine the end point of the ITC's lowering movement. The vertical gap is thus adapted to any mechanical tolerance variations of the faceplate or the ITC screen, and there is no need for physical spacers.

The assembly is then removed 110 from the tool. The remaining uncured resin, if any, is then cured 120 by additional ultraviolet electromagnetic radiation through the faceplate. Alternatively, the remaining uncured resin is cured by infrared lamps or conduction heating.

A method of attachment of a faceplate to a ITC screen of a CRT monitor for the manufacture of a touch-sensitive display has now been described by way of an example implementation of the present invention. It will however be appreciated that the invention is also applicable to the attachment of other faceplates such as anti-reflective screens, and that the invention may use a different display device such as a liquid crystal display panel or a gas plasma panel. Additionally, the method of the invention has been described as a stage in the production of a display unit but could equally be performed as a method of retrofitting touch panels to assembled monitors. In each of these methods, touch-input enabled display units can be produced using standard manufacturing processes developed for non-touch-input displays, with the additional step of attachment of a touchplate and sensors. Retrofit is not the preferred method of attachment in view of difficulties in performing such an operation without damaging the monitor.

An alternative to the rapid curing of the adhesive material at the edges of the faceplate is to use physical containment of the adhesive material. In one such process, an elastic gasket is automatically positioned on the upper surface of the faceplate. The gasket is of such a thickness that it forms a seal between the CRT and the faceplate before the advancing adhesive interface reaches it. The gasket has a plurality of holes pierced through it, at the positions (proximate the corners of the faceplate) which are the last to be reached by the adhesive material as it is forced to spread outwardly between the opposed surfaces, to allow escape of air. The holes are manually or automatically plugged once reached by the advancing adhesive. The aspects of the present invention of using automatic detection of the onset of the condition of gas entrapment and of the adhesive reaching the edge of the assembly (and automatic control in response to the detection) are equally applicable to a method which uses physical containment of the adhesive as an alternative to rapid selective cure.

It should also be noted that the selective curing aspects of the invention are applicable to manual as well as automated attachment processes.

We claim:

1. A method of attaching a faceplate (20) to a screen of a visual display unit (VDU) (40), by adhesion of opposed surfaces thereof, comprising the steps of:

dispensing (80) a volume of a transparent adhesive material onto at least one of said surfaces;

bringing said surfaces together (90) in a controlled manner to cause the adhesive material to spread across said surfaces towards their edges to form an adhesive layer (41) which fills the gap therebetween;

selectively curing (100) the adhesive at the edges of the opposed surfaces to secure the faceplate to the screen of the VDU; and subsequently curing (120) the remaining uncured adhesive material.

2. A method according to claim 1 including the step of locating (60) reference points on the faceplate and on the VDU for precise relative positioning of said surfaces by a positioning tool without the need for the positioning of physical spacers between said surfaces.

3. A method according to claim 2, wherein the termination point for the step of bringing said surfaces together is determined using a detection means for determining when the adhesive material has reached all points around the outer edges of the opposed surfaces.

4. A method according to claim 1, wherein the step of selectively curing (100) the adhesive material at the outer edges of the opposed surfaces comprises progressively curing the adhesive material at positions around the edges as the advancing adhesive material reaches each of said positions.

5. A method according to claim 1, wherein the step of selectively curing (100) the adhesive at the edges of the opposed surfaces is carried out in response to a signal from a detection means arranged to detect the adhesive material reaching the edges of the opposed surfaces.

6. A method according to claim 1, wherein the step of bringing said surfaces together (90) in a controlled manner is performed under control of signals from a detection means arranged to detect the onset of entrapment of gas behind the advancing interface of the adhesive material, thereby to avoid said entrapment.

7. A method according to claim 1, wherein the step of selectively curing (100) the adhesive material at the edges of the opposed surfaces involves masking the adhesive layer, other than a portion of the adhesive layer which is in the region of the edges of the opposed surfaces, from curing irradiation.

8. A method according to claim 1, wherein the step of selectively curing (100) the adhesive material at the edges of the opposed surfaces includes irradiating the adhesive material at said edges with ultraviolet electromagnetic radiation and/or thermal curing using thermal radiation or conductive heating.

9. A method according to claim 1, wherein the step of curing (120) the remaining uncured adhesive material, if any, following the step of selectively curing (100) the adhesive material at the edges of the opposed surfaces, comprises either conduction heating or applying ultraviolet or infra-red electromagnetic radiation to the adhesive layer.

10. A method according to claim 1, wherein said VDU screen surface has been pre-coated (70) with a wetting agent.

11. A method according to claim 1, wherein said VDU screen has a textured coating and said adhesive material is selected to chemically soften and swell the textured coating such that the difference in refractive index between the adhesive material and the VDU screen is exhibited gradually over a finite width of material thereby to reduce reflections from the interface between the VDU screen and the adhesive material.

* * * * *